United States Patent
Greil

(10) Patent No.: US 6,814,176 B2
(45) Date of Patent: Nov. 9, 2004

(54) DIFFERENTIAL CASE FOR MOTOR VEHICLES

(75) Inventor: Juergen Greil, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/235,860

(22) Filed: Sep. 6, 2002

(65) Prior Publication Data

US 2003/0060321 A1 Mar. 27, 2003

(30) Foreign Application Priority Data

Sep. 7, 2001 (DE) .......................................... 101 43 886

(51) Int. Cl.⁷ ............................................. B60K 17/00
(52) U.S. Cl. ...................... 180/374; 180/375; 180/376; 180/378; 475/230
(58) Field of Search ................................ 180/374, 375, 180/376, 378; 74/424; 475/230

(56) References Cited

U.S. PATENT DOCUMENTS

| | | | |
|---|---|---|---|
| 1,185,174 A | | 5/1916 | Brush |
| 1,289,531 A | * | 12/1918 | Parsons ........................ 74/390 |
| 1,884,178 A | | 12/1934 | Diack |
| 2,693,244 A | * | 11/1954 | Rockwell et al. ......... 180/24.09 |
| 4,050,534 A | * | 9/1977 | Nelson et al. ............ 180/24.09 |
| 4,148,262 A | * | 4/1979 | Eichinger .................... 105/131 |
| 4,513,834 A | * | 4/1985 | Hayashi et al. ............. 180/370 |
| 4,781,259 A | * | 11/1988 | Yamaoka et al. ............ 475/230 |
| 4,787,468 A | | 11/1988 | Kobayashi |
| 4,864,890 A | * | 9/1989 | Friedrich et al. ........... 475/230 |
| 5,125,284 A | | 6/1992 | Carriere |
| 5,293,686 A | * | 3/1994 | Martin et al. .............. 29/893.1 |
| 5,634,374 A | * | 6/1997 | Depietri ........................ 74/420 |
| 5,644,955 A | * | 7/1997 | Yamamoto .................... 74/607 |
| 6,024,666 A | * | 2/2000 | Bunnow ...................... 475/230 |
| 6,200,241 B1 | * | 3/2001 | Pinotti et al. ............... 475/230 |
| 2002/0003058 A1 | | 1/2002 | Hori et al. |

FOREIGN PATENT DOCUMENTS

| | | |
|---|---|---|
| DE | 35 01 798 C2 | 7/1989 |
| DE | 198 39 481 A1 | 3/2000 |
| DE | 198 54 379 A1 | 5/2000 |
| EP | 0 602 365 A2 | 6/1994 |
| EP | 0 901 423 B1 | 5/2000 |
| GB | 2 154 959 A | 9/1985 |
| JP | 63-235128 | 9/1988 |
| JP | 63-275430 | 11/1988 |

OTHER PUBLICATIONS

Beitz et al. "Dubbel: Taschenbuch fuer den Mashinenbau" 1990, Springer–Veriag, Federal Republic of Germany.
European Search Report.
Beitz et al. "Dubbel: Taschenbuch fuer den Mashinenbau" 1990, Springer–Vertag, Federal Republic of Germany.
European Search Report.

* cited by examiner

Primary Examiner—Daniel G. DePumpo
(74) Attorney, Agent, or Firm—Crowell & Moring LLP

(57) ABSTRACT

In a transfer case the ring gear of the crown wheel and the meshing pinion are arranged on that side of the ring gear carrier of the crown wheel that faces away from the center of the differential gear of the transfer case. Stated simply, the pinion and the ring gear of the crown wheel are arranged so as to be "reflected", that is, on the "other side" of the ring gear carrier of the crown wheel, as compared to a conventional differential gear. This feature allows the pinion shaft to be mounted rigidly and, thus, optimized for noise and efficiency.

13 Claims, 5 Drawing Sheets

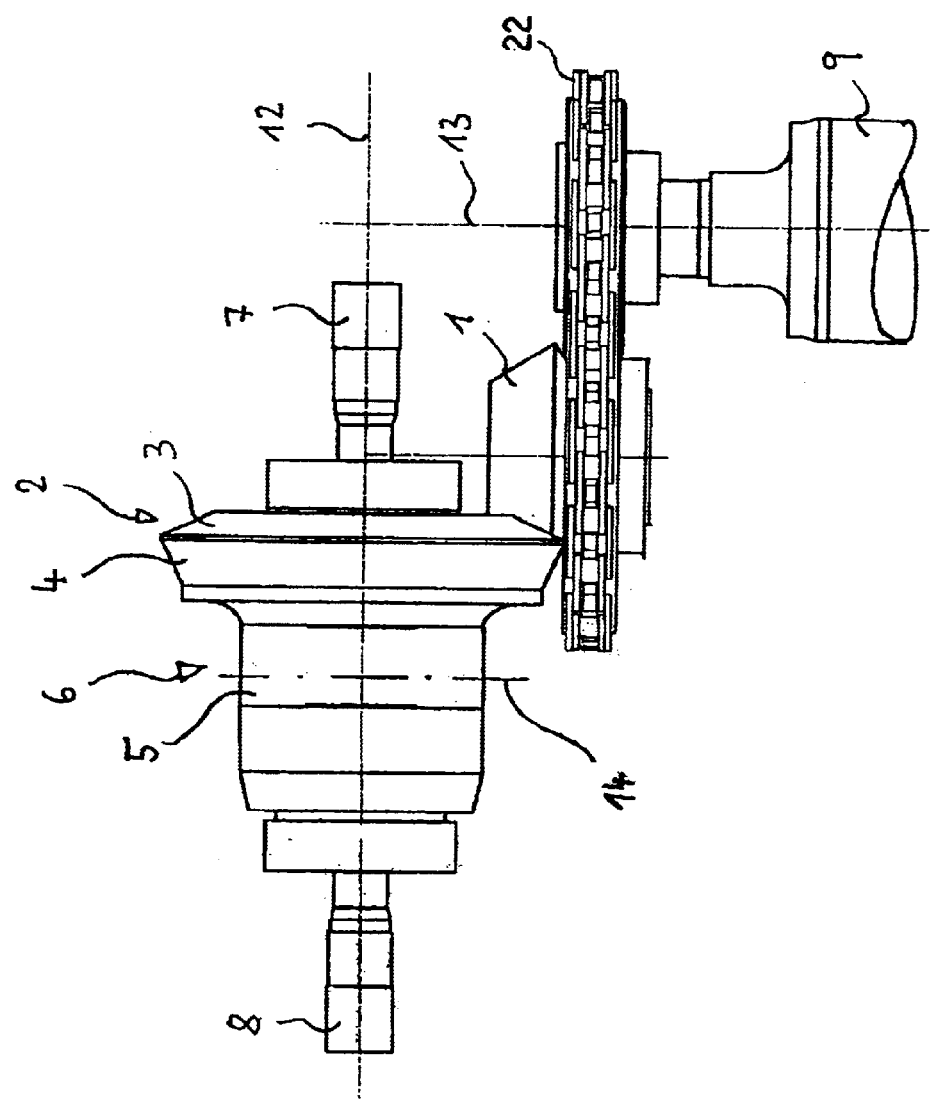

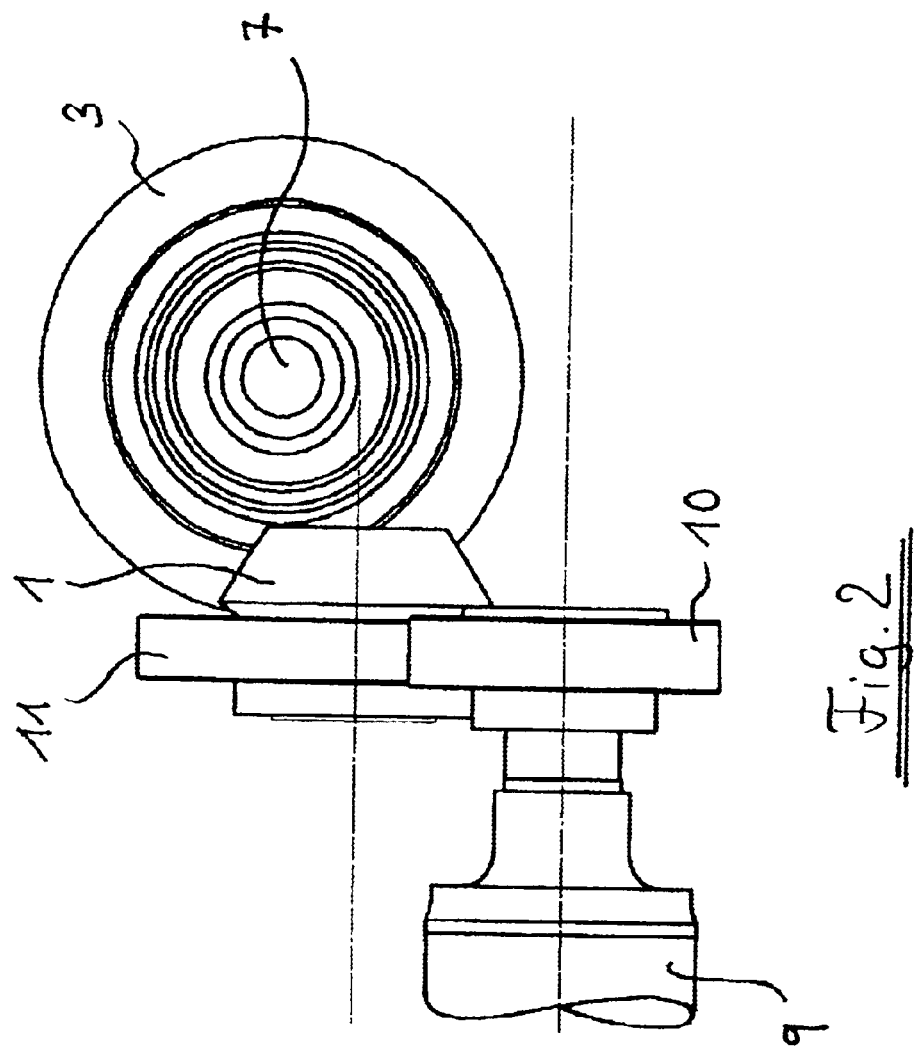

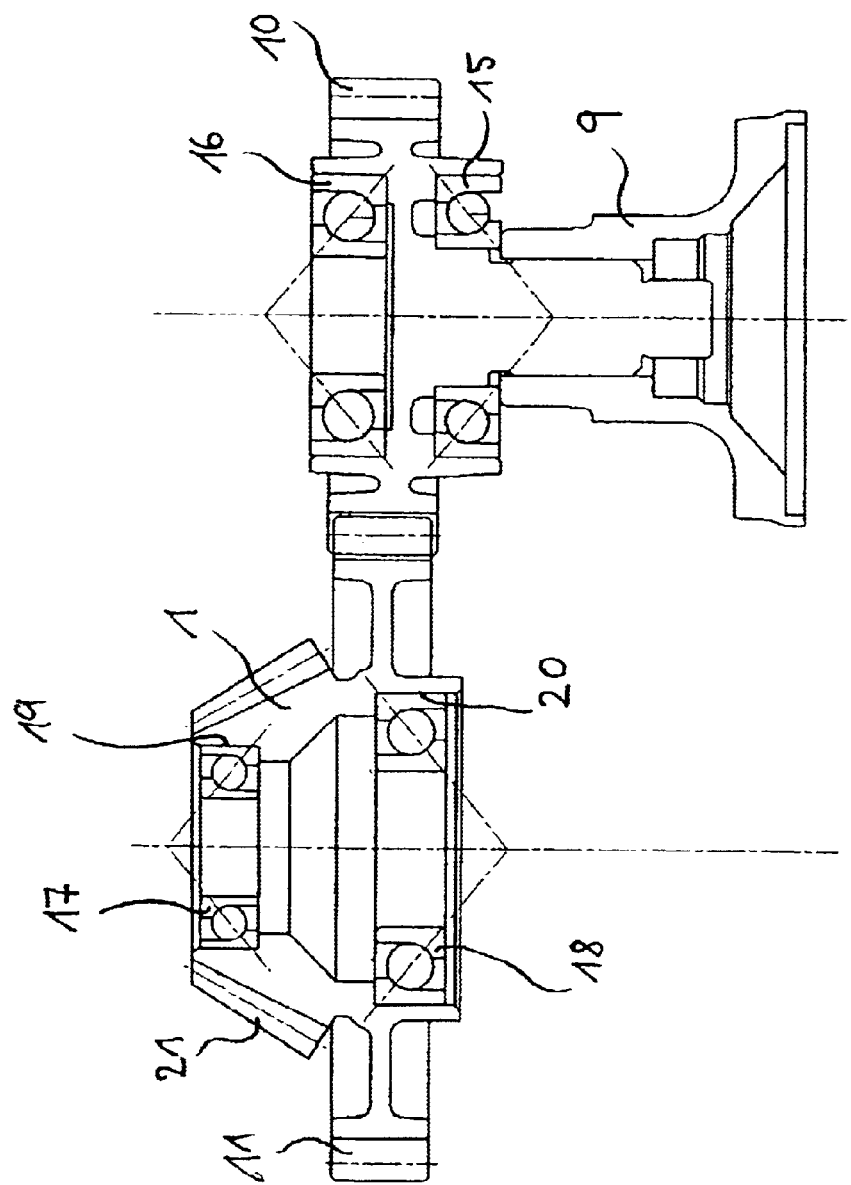

DIFFERENTIAL CASE FOR MOTOR VEHICLES

BACKGROUND AND SUMMARY OF THE INVENTION

The present invention relates to a differential case for motor vehicles.

DE 198 39 481 A1 describes a rear axle differential case for motor vehicles that comprises a pinion, which is driven with a cardan shaft or propeller shaft and which meshes with a crown wheel. The crown wheel in turn drives a differential gear, from which two output shafts extend out of the differential case on opposite sides. The crown wheel includes a ring gear and a ring gear holder, which is formed by the housing of the differential gear. The ring gear holder is arranged off-centered with respect to the differential gear. The ring gear of the crown wheel and the pinion are arranged on that side of the ring gear carrier that faces the "central plane" of the differential gear. In this differential gear the pinion shaft is mounted with two double row tandem angular ball bearings, which are installed in an O arrangement. The first angular ball bearing is arranged directly at the pinion, and the second, at a distance from the pinion on the pinion shaft. Thus, the pinion is mounted in "overhung" position.

In most of the conventional motor vehicles with a rear axle drive, the propeller shaft runs in a "central tunnel", that is essentially in the center of the motor vehicle from the transmission to the differential case towards the rear.

In some vehicles, such as an all wheel drive vehicle, described in EP 0901 423 B1, the propeller shaft runs laterally offset in relation to the central longitudinal plane of the motor vehicle. Correspondingly the differential case is also arranged off-centered at the rear axle. Owing to the off-centered arrangement of the differential case, two output shafts of different length are required at the rear axle, a feature that results in a more elaborate design and additional expense.

An object of the invention is to provide an improved differential case for motor vehicles with a laterally offset propeller shaft.

The problem is solved with the invention described and claimed hereinafter.

In an embodiment of the present invention, the ring gear of the crown wheel and the engaging pinion are arranged on that side of the ring gear carrier of the crown wheel that faces away from the differential gear of the differential case. In other words, the pinion and the ring gear of the crown wheel are arranged to be "reflected", that is, on the "other side" of the ring gear carrier of the crown wheel, as compared to a conventional differential gear.

A result of the "reflected" arrangement of the crown wheel ring gear and of the pinion is a number of significant design advantage. First of all, the reflected arrangement of the pinion and of the crown wheel ring gear allows the lateral offset of the propeller shaft to be compensated. Another advantage is that the pinion no longer has to be mounted in a "overhung" position, as is in DE 198 39 481 A1. In the prior art, the pinion head is virtually aligned with the differential case. In contrast, in the "reflected" arrangement, there is adequate space between the pinion head and the output shafts for a pinion bearing, a factor that is very advantageous to the rigidity of the pinion mounting.

According to a further development of the invention, the pinion shaft has two hollow cylindrical recesses, into each of which a pinion bearing is installed. One of the pinion bearings can be arranged directly "below" the pinion teeth, and the other pinion bearing "just behind" the pinion teeth. This enables an extremely rigid pinion mounting, a feature that is advantageous for many reasons. A very rigid mounting increases, for example, the service life and the efficiency of the transmission. At the same time it reduces noise emissions.

Preferably angular ball bearings, installed in an O arrangement, are used for mounting the pinion. Thus, the bearing rigidity and the efficiency of the differential case can be further improved.

In various novel motor vehicle concepts, it is advantageous to use the central tunnel, which is the central longitudinal area of the motor vehicle, for housing various "motor vehicle components", such as the fuel tank. Such an arrangement is advantageous, especially with respect to "derivability". Derivability means that one basic platform can be used for different model variants, for example limousine, station wagon, and coupe, with and without just slight reconstruction.

In such motor vehicles the propeller shaft runs laterally offset in relation to the central longitudinal axis of the motor vehicle by, for example, 200 mm. According to the invention, there is a gear or a chain drive to "bridge the distance" between the offset propeller shaft and the differential case pinion in the area of the rear axle. Thus, the differential case can still be arranged in the center of the motor vehicle, when the propeller shaft is offset relatively far. This feature has the significant advantage that two equally long or even identical output shafts can be used.

Other objects, advantages and novel features of the present invention will become apparent from the following detailed description of the invention when considered in conjunction with the accompanying drawings.

BRIEF DESCRIPTION OF THE DRAWINGS

FIG. 1b is a top view of the differential gear of FIG. 1a with a chain drive.

FIG. 2 is a side view of the differential case of FIG. 1a.

FIG. 4 is a sectional view of the differential case according to FIG. 1a.

DETAILED DESCRIPTION OF THE INVENTION

Figure 1A:
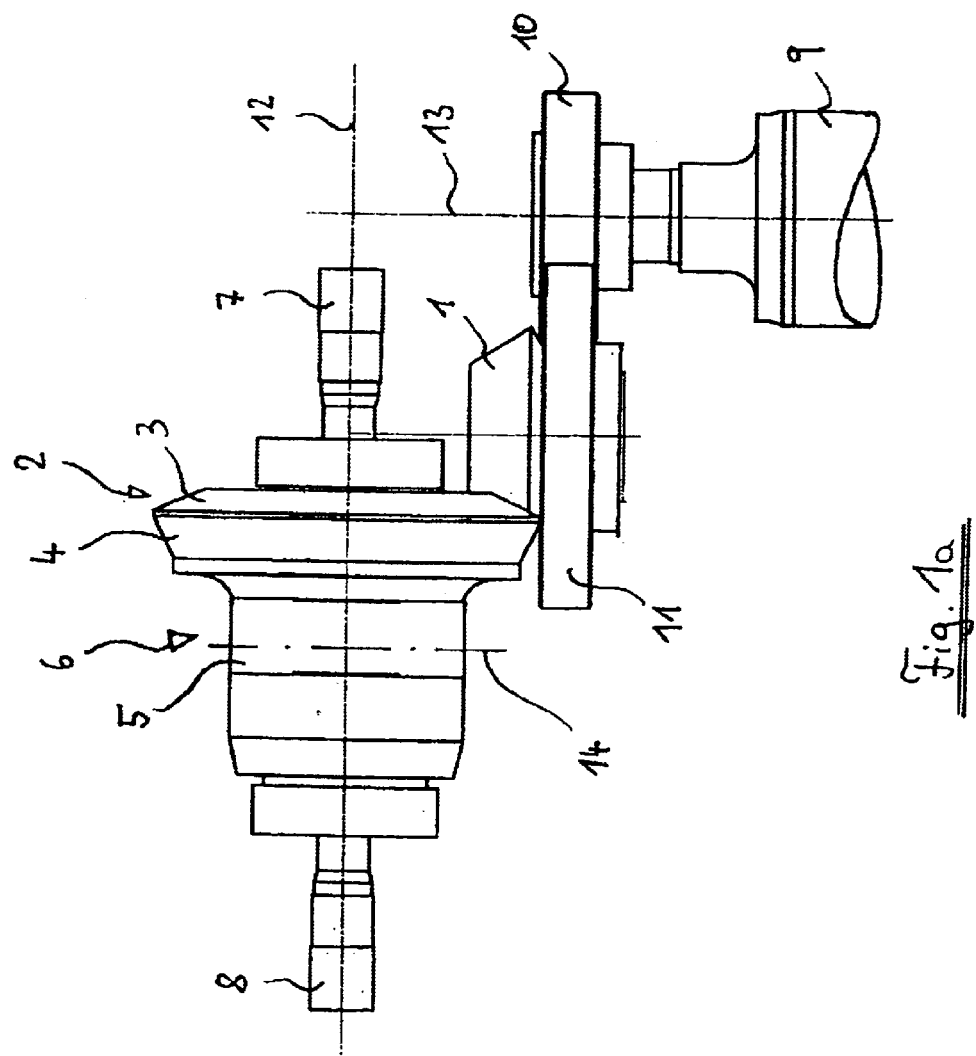
FIG. 1a is a schematic top view of the differential case according to the invention.

FIG. 1a is a schematic drawing of a rear axle differential case of a motor vehicle with a drive pinion 1, which meshes with a crown wheel 2. The crown wheel 2 is formed by a ring gear 3 and a ring gear carrier 4. The ring gear carrier 4 is fastened to a housing 5 of a differential gear 6 so as not to rotate.

Two output shafts 7, 8, which are connected to the wheels of the motor vehicle (not illustrated here), branch off from the differential gear 6 or from the differential case on opposite sides.

The pinion 1 is driven by a propeller shaft 9, which is connected to the motor vehicle transmission (not illustrated) and whose end has a gear 10, which meshes with a gear 11, which is connected to the pinion 1. The gears 10, 11 can be replaced by a chain drive 22, as shown in FIG. 1b.

As evident from FIG. 1a, the propeller shaft 9 is offset laterally, that is, in the direction of the longitudinal axis 12 of the output shafts 7, 8. The distance between the longitudinal axis 13 and the "center" 14 of the differential gear 6 or the differential case is, for example, 200 mm.

To "compensate" for this lateral offset of the propeller shaft 9, the ring gear 3 of the crown wheel 2 and the pinion 1 are arranged "reflected" with respect to the ring gear carrier 4, as compared to conventional differential cases. That is, the ring gear 3 and the pinion 1 are arranged on that side of the ring gear carrier 4 that faces away from the differential case 6 or the center 14 of the differential case 6.

Another difference, compared to conventional differential cases is that the propeller shaft 9 is not connected here coaxially to the pinion 1, but rather by the gear arrangement 10, 11. The gear arrangement 10, 11 serves to "bridge" the lateral offset of the propeller shaft and to enable an additional translation.

Owing to the "reflected arrangement" of the ring gear 3 and the pinion 1 there are still other significant advantages that are explained in detail in conjunction with FIG. 4.

FIG. 2 is a side view of the differential case of FIG. 1a. In this drawing the propeller shaft 9 runs below the output shafts 7, 8. This height differential is compensated for by the gear arrangement 10, 11 and the pinion 1, meshing with the ring gear 3.

Figure 3:
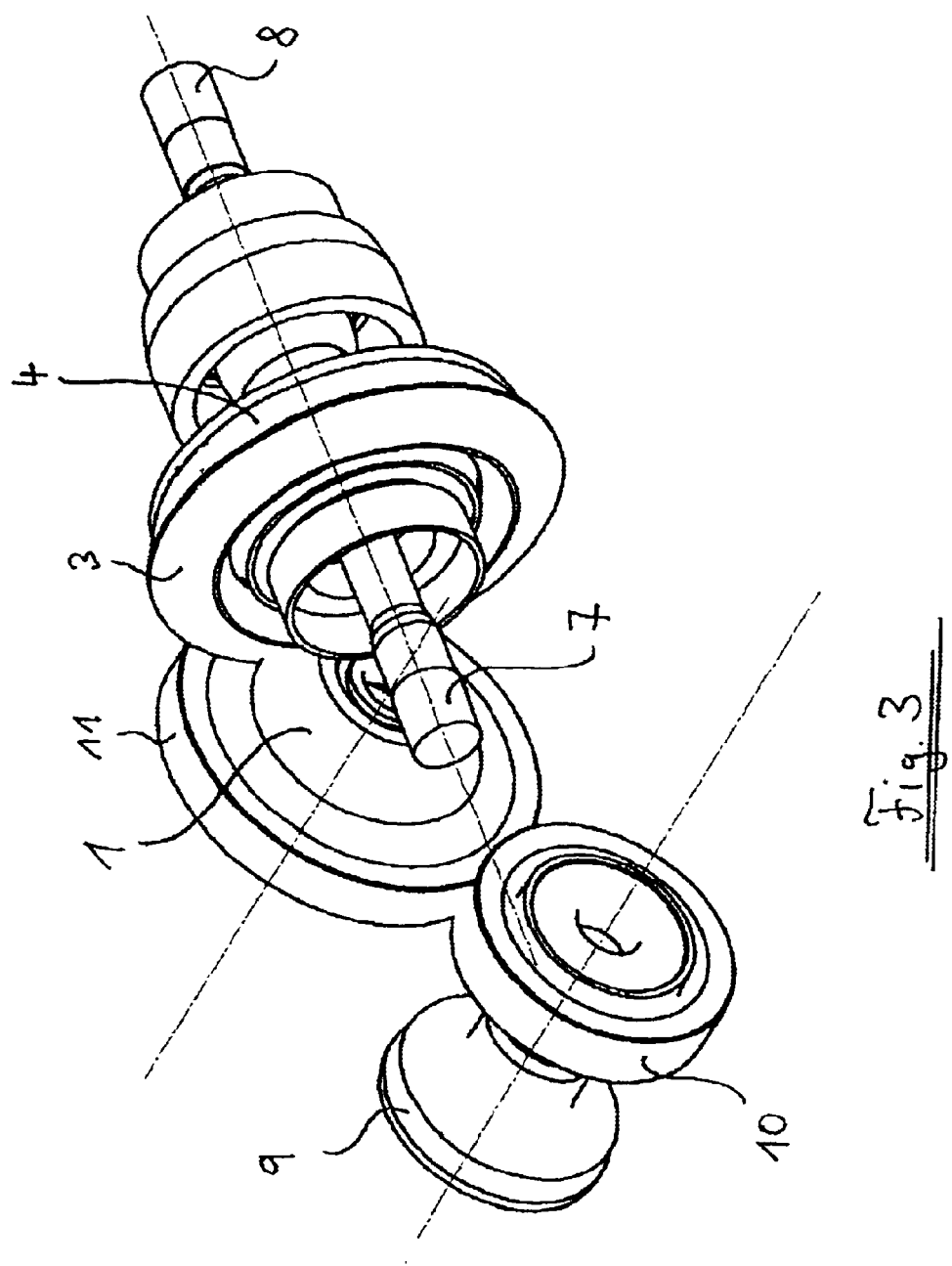
FIG. 3 is a schematic perspective view of the differential case of FIGS. 1a and 2.

FIG. 3 is a schematic perspective view of the differential case of FIGS. 1a and 2. Here, too, the lateral offset and the height offset of the propeller shaft 9 can be clearly recognized.

FIG. 4 is a schematic drawing of a sectional view of the differential case in the area of the pinion 1 and the propeller shaft 9. The end of the propeller shaft 9 is connected to the gear 10, which is mounted here with two angular ball bearings 15, 16, which are installed in an O arrangement and shown only as a schematic. The gear 10 meshes with the gear 11, which is connected as one piece to the pinion 1.

The pinion 1 is mounted by two angular ball bearings, in particular by a first angular ball bearing 17 and a second angular ball bearing 18, which are also installed in an O arrangement. As shown in FIG. 4, the pinion 1 is a "hollow pinion". The first angular ball bearing 17 is arranged in a recess 19, and the second angular ball bearing 18 is arranged in a recess 20 of the pinion 1. The first angular ball bearing 17 sits directly below the pinion gear 21. In contrast, the second angular ball bearing 18 sits just behind the pinion gear 21, that is, in the region of the rear half of the gear 11.

The pinion mounting, depicted in FIG. 4, is different from the pinion mountings of conventional differential cases. Namely the pinion 1 is not mounted in overhung position. The result of the two angular ball bearings 17, 18, especially the angular ball bearing 17, sitting directly under the pinion gear 21, is an extremely rigid pinion mounting. Compared to a pinion, mounted in overhung position, the two sided mounting of the pinion 1 results in a significant decrease in wear and a longer service life as well as better efficiency of the transmission.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A differential case for motor vehicles comprising:
   a differential gear having a central plane;
   a crown wheel that drives a differential gear, the crown wheel including,
      a ring gear, and
      a ring gear carrier;
   a pinion that meshes with the crown wheel, wherein the pinion is mounted by first and second bearings and includes a pinion gear;
   wherein the first bearing is arranged directly in an area of the pinion gear, and the second bearing is arranged behind the pinion gear;
   wherein the pinion and the ring gear of the crown wheel are arranged on a side of the ring gear carrier that faces away from the central plane of the differential gear; and
   wherein the pinion has hollow cylindrical recesses, in which the first and second bearings are arranged, respectively.

2. The differential case of claim 1, wherein the ring gear carrier is off-centered with respect to the differential gear.

3. The differential case of claim 1, further comprising two output shafts, which branch off from opposite sides of the differential case.

4. The differential case of claim 3, wherein the differential gear is arranged in the center of the motor vehicle, and wherein the output shafts have about the same length.

5. The differential of claim 1, wherein the pinion is driven by a propeller shaft which is perpendicular to the output shafts and is offset laterally with respect to a central plane of the differential case.

6. The differential case of claim 1, wherein the propeller shaft is offset laterally by 150 mm to 250 mm with respect to a central longitudinal plane of the motor vehicle.

7. The differential case of claim 1, wherein the propeller shaft is offset laterally by 200 mm with respect to a central longitudinal axis of the motor vehicle.

8. The differential case of claim 1, wherein the first bearing is arranged directly below the pinion gear.

9. The differential case of claim 8, wherein the bearings are angular ball bearings, which are arranged in an O arrangement.

10. The differential case of claim 9, further comprising a torque transmission unit that connects the pinion to the propeller shaft.

11. The differential case of claim 10, wherein the torque transmission unit includes a gear arrangement.

12. The differential case of claim 11, wherein the gear arrangement includes first and second gears, and wherein the first gear engages the propeller shaft, and the second gear engages the pinion.

13. The differential case of claim 10, wherein the torque transmission unit includes a chain drive.

* * * * *